Patented Jan. 1, 1935

1,986,749

UNITED STATES PATENT OFFICE 1,986,749

MANUFACTURING OF STABLE SOLUTIONS OF THE SODIUM SALT OF DIAMINO-DIOXY-ARSENOBENZENE-M E T H Y L E N - SULPHINIC ACID AND THE PRODUCT

Baptist Reuter, Krailling-Planegg, Germany

No Drawing. Application August 20, 1932, Serial No. 629,740. In Germany February 10, 1930

6 Claims. (Cl. 167—69)

It is already known that the addition of sodium bisulphite to neosalvarsan grape sugar solutions will render such solutions relatively stable. Such additions are, however, injurious to the patient as they are likely to cause irritations. Furthermore, the poisoning effect of such solutions is too high to be satisfactory.

Such solutions for these reasons have not been used to any great extent, but physicians are still forced to rely on the solid products of diaminodioxyarsenobenzene as "neosalvarsan", "nearsphenamine" which possess many disadvantages compared with the solution ready for use described in the following application.

The solid products ought to be dissolved in water three times redistilled. It is necessary to have ready for preparation of the solution sterilized vessels, whereas my solution is immediately ready for medical administration. The solution is very stable and can be drawn into the syringe and administered by injection direct from the ampule. The chemical preparation of the solid products used up to the present for solutions as arsphenamine, neosalvarsan requires a long time, it is laborious and expensive. It requires an extensive supply of apparatus.

The manufacturing of solid products for example of neosalvarsan is described in the following paragraphs.

First it is necessary to manufacture the dihydrochloride of 3.3'-diamino-4.4'-dioxyarsenobenzene in the following manner:

According to the German Patent 224,953, it is well known, that 3-nitro-4-oxybenzenearsinicacid can be reduced by sodium hydrosulphite to the base 3.3'diamino-4.4'-dioxyarsenobenzene. This product is not pure, but contains some impurities probably decomposition products of the sodium hydrosulphite.

Until the present time it was necessary to remove the impurities by transferring the raw base in to the mono and dihydrochloride of 3.3'-diamino-4.4'-dioxyarsenobenzene while dissolving it in somewhat less than 1 mol. of hydrochloric acid in a methylalcoholic-aqueous solution. The slurry had to be filtered, another mol. of hydrochloric acid was added to the filtrate and the solution poured with agitation into a large amount of ether in order to precipitate the dihydrochloride of 3.3'-diamino-4.4'-dioxyarsenobenzene, which must be dried for several days in vacuo.

The second step for manufacturing of the solid compounds of the sulphoxylate of the 3.3'-diamino-4.4'-dioxyarsenobenzene was the transformation of the dihydrochloride of diaminodioxyarsenobenzene into the purified base by dissolving it in water, precipitating with an alkali material, filtering, washing out with water and drying the base in vacuo.

The third step described in the German Patent 245,756, Example 4, and in the United States Patent 1,564,859 is the process of dissolving the base in formaldehyde sulphoxylate at the same time heating the mixture until all base is dissolved. The solution is treated with concentrated hydrochloric acid until all the methylenesulphinic acid of 3.3'-diamino-4.4'-dioxyarsenobenzene is precipitated.

This acid is filtered, washed with water, filtered again and dried in vacuo. This acid is now dissolved in caustic soda solution and is then precipitated by a large amount of alcohol and ether. Instead of precipitating, it is possible to evaporate the solution in vacuo to dryness.

Experimenters have tried to make stable compounds from the thus obtained solid sulphoxylate of 3.3'-diamino-4.4'-dioxyarsenobenzene, but stable solutions ready for direct administration have not been obtained. It is true that the protection of stable neosalvarsan grape sugar solutions by the use of sodium bisulphite has been proposed. As is mentioned above, however, such solutions are dangerous and injurious to the patient.

In the Swiss Patent 104,202 is described the manufacture of a product prepared from a solid compound of the methylensulphoxylate of 3.3'-diamino-4.4'-dioxyarsenobenzene, by dissolving 10 grams of the product in 48 cc. of a solution of grape sugar of 75% concentration. The final product is described as a compound, soluble in water, which can be used for the preparation of therapeutic solutions which means that the product is not a solution ready for use, but a solid product.

It is well known, that solutions prepared from solid compounds of the salts of methylensulphonic-acid of the 3.3'-diamino-4.4'-dioxyarsenobenzene after the injection bring about an etheric taste very objectionable to many patients.

The solutions prepared from such solid products are not stable. Some precipitates separate after standing awhile, and quickly change the color.

This is especially the case with products made from the methylensulphinic acid of diaminodioxyarsenobenzene.

I have found a process for manufacturing stable solutions of 3.3'-diamino-4.4'-dioxyarsenobenzene which are ready for immediate use, which means that the solution can be administered directly without other manipulations.

According to my process described in this application it is not necessary to make dihydrochloride of 3.3'-diamino-4.4'-dioxyarsenobenzene, nor is it necessary to manufacture solid products of the methylensulphinic salts of 3.3'-diamino-4.4'-dioxyarsenobenzene, nor to separate the methylensulphinic-acid of the 3.3'-diamino-4.4'-dioxyarsenobenzene and then transfer this acid into the salt again. Neither methylol, nor ether nor other non-solvents are needed for precipitation.

The solution is ready within 48 hours, whereas the manufacturing process by means of the dihydrochloride of 3.3'-diamino-4.4'-dioxyarsenobenzene requires at least two to three weeks.

My process of manufacturing according to this application is very simple, cheaper than the old process of manufacturing the solid compounds named above and then dissolving them in redistilled water. It takes only a very short time and requires much less labor and apparatus than the old process producing the solutions by means of the purified solid products.

It is described as follows:

3-nitro-4-oxybenzenearsenic acid is heated with a solution of sodium hydrosulphite as described in the German Patent 224,953. The precipitate is filtered off, keeping the mixture out of contact with the air, washed with distilled water and dried until no further water flows from the precipitate. To prevent the air from coming in contact with the material nitrogen or carbonic acid is used.

The product thus obtained, the raw base of 3.3'-diamino - 4.4' - dioxyarsenobenzene containing about 50% water contains as impurities inorganic compounds. The product, still humid, is slurried with a solution of grape sugar of about 40% concentration and a solution of formaldehyde sulphoxylate is added in the proportion of one mol. to 1 mol. of the named raw base or in somewhat less proportion. The product is then heated on the steambath for about 1½ hours to a temperature of 66–70 degrees C., while stirring.

The greater part of the yellow slurry goes in solution, a gray precipitate remaining undissolved. The product is then cooled to room temperature and the precipitate is filtered off and a stream of nitrogen or another inert gas is passed through the solution for about half an hour. In this way it is possible to make concentrated solutions, which may be diluted with a solution of grape sugar as disclosed in the examples, or it is possible to prepare directly a solution which may be desired for administration.

In all the steps of manufacturing the presence of air and oxygen must be excluded.

The solutions thus obtained are yellow and clear and do not separate precipitates as the former solutions do, which are prepared from solid products like neosalvarsan or nearsphenamin and others. The solutions are introduced into ampules in presence of an inert atmosphere.

My invention described in this application is new as regards the immediate treatment of the raw base of diaminodioxyarsenobenzene with formaldehyde sulphoxylate.

This raw base described in the German Patent 224,953 is different from the base purified as described in the German Patent 245,756 and in the United States Patent 1,564,859.

My raw base is not completely soluble in the solution of formaldehyde sulphoxylate, whereas the purified bases used in German Patent 245,756 Example 4 and in the United States Patent 1,564,859 are completely soluble in the sulphoxylate of formaldehyde as described in those patents.

Another difference between both bases is as follows: the products used in German Patent 245,756 and in United States Patent 1,564,859 are dry products, made by processes of purification, whereas the base used according to my invention is a humid product formed directly from nitro-oxybenzenearsinic acid.

It was not obvious that the raw base used according to my invention could be purified from impurities in the manner I have done and neither was it obvious that the solutions thus obtained would stay clear for long periods of time, without depositing precipitates. At the present time I have solutions which are still clear which have been prepared 18 months ago.

Moreover, my invention shows great commercial advantages compared with the methods used up to date for preparing solution from solid diaminodioxyarsenobenzene-sulphoxylates. In my process it is not necessary to prepare solid sulphoxylates or the intermediate products of the same, which manufacture results in high costs of the apparatus, precipitants and labor.

My process is very cheap, simple, and prevents the possibility of oxidation of the arsenocompound contained in the solution.

The disagreeable taste of ether resulting from the use of solid products is avoided.

Further I have found, that a solution prepared according to my invention is less poisonous than solutions made from the solid products named above, when administered in an amount showing an equal content of arsenic in both solutions.

According to the regulation for the control of the manufacture, importation and sale of arsphenamine and its derivatives page 2 (Treasury Department, United States Health Service, Miscellaneous Publication No. 22) the following toxicity tests are prescribed as follows:

"From nearsphenamine containing 19–20% arsenic the tolerated dose per Kg mouse is 288 mgr., only 60% of the mice must survive the period of observation."

From my product calculated to a content of 19–20% arsenic, 421 mgr. are tolerated and after administration all mice were found to survive the period of observation.

This illustrates the low toxicity of my preparation compared with nearsphenamine. The appended examples describe the preparation of solutions, which contain in 10 cc. 0.4 gram of salvarsan or 0.6 gram neosalvarsan.

Other concentrations can be made, as desired.

EXAMPLES

Example 1

6 grams 4-oxy-3-nitrobenzenearsinicacid are reduced with a solution of sodium hydrosulphite in the usual manner resulting in the raw base. The latter is separated in an inert atmosphere from the mother liquor and washed out with distilled water free of air. It is dried by suction until no water flows from the material, at the same time passing nitrogen or carbonic acid gas over the precipitate. The wet raw base thus obtained weighing about 6.5 or 7 grams is slurried with 20 cc. of a sterilized solution of grape sugar of about 40% concentration resulting in a thin homogeneous mass. To this slurry are added 3.0 cc. of a solution of formaldehyde sulphoxylate possessing a concentration of 48% volume. The mixture is heated with agitation to about 65 degrees C. maintaining this temperature for about one hour, until there remains only a gray precipitate undissolved. The mixture is cooled to about 20 degrees C. and then is added a sterilized solution of grape sugar of 40% concentration free from air, until a volume of 100 cc. is obtained. Nitrogen is passed through the slurry for half an hour and after standing for about 12 hours in room temperature the liquid is filtered and introduced into ampules in an inert atmosphere. In all steps it is necessary to work in indifferent atmosphere. The clear yellow solution introduced into ampules in the absence of air shows a very slight acid reaction with litmus. It does not deposit precipitates after standing 18 months. 10 cc. of this solution contains about 0.12 gram of arsenic corresponding to 0.6 gram neosalvarsan.

*Example 2*

6 grams 4-oxy-3-nitrobenzenearsinicacid are reduced with a solution of sodium hydrosulphite in the customary manner resulting in the raw base. The latter is separated in an inert atmosphere from the mother liquor and washed out with distilled water which is free from air. It is dried by suction until no water flows from the material, at the same time passing nitrogen or carbonic acid gas or another inert gas over the precipitate. The damp raw base thus obtained weighing about 6.5 or 7 grams is slurried with 20 cc. of a solution of grape sugar of about 40% concentration resulting in a thin homogeneous mass. To this slurry are added 3.0 cc. of a solution of formaldehyde sulphoxylate having a concentration of 48% by volume. The mixture is heated with stirring to about 65 degrees C., maintaining this temperature for about one hour until there remains only a gray precipitate. The mixture is cooled to about 20 degrees C., the concentrated solution is filtered and the residue is washed with about 10 cc. of a grape sugar solution of 40% concentration. The filtered solution is diluted to 100 cc. with a sterilized grape sugar solution of 40% concentration. Nitrogen is passed through the solution for half an hour and the clear yellow solution is introduced into ampules out of contact with the air.

I claim:

1. A process for preparing a solution of the sodium salt of diaminodioxyarsenobenzene-methylene-sulphoxyl acid in stable, immediately usable, form which comprises the steps of mixing crude diaminodioxyarsenobenzene with sterilized grape sugar solution which is free from air, adding thereto an amount of a concentrated solution of formaldehyde sulphoxylate not exceeding one molecule per molecule of diaminodioxyarseno benzene, heating the mixture, allowing the mixture to stand until the impurities are precipitated, separating the precipitate, and then adjusting the sugar content of the solution from which the precipitate has been separated to any desired value by the addition of sterilized grape sugar solution, all of the steps being carried out in an inert atmosphere.

2. A process for preparing a solution of the sodium salt of diaminodioxyarsenobenzene-methylene-sulphoxyl acid in stable, immediately usable, form which comprises the steps of preparing the diaminodioxyarsenobenzene by reducing 3-nitro-4-oxy-benzene-1-arsenic acid and mixing the product with sterilized grape sugar solution which is free from air, adding thereto an amount of formaldehyde sulphoxylate not exceeding one molecule per molecule of diaminodioxyarsenobenzene, heating, allowing the mixture to stand until the impurities are precipitated, filtering to separate the insoluble components and then adjusting the sugar content of the filtrate to any desired value by the addition of sterilized grape sugar solution, all of the steps being carried out in an inert atmosphere.

3. A process for the preparation of a solution of the sodium salt of diaminodioxyarsenobenzene-methylene-sulphoxyl acid which comprises the steps of preparing crude diaminodioxyarsenobenzene by reduction of 3-nitro-4-oxy-benzene-1-arsenic acid, and mixing the product without further purification with sterilized grape sugar solution which is free from air, adding formaldehyde sulphoxylate in an amount sufficient to produce the desired salt, heating, allowing the mixture to stand until the impurities are precipitated, filtering to separate the insoluble components, and then adjusting the solution to any desired sugar content by the addition of sterilized grape sugar solution in sufficient amount, all of the steps being carried out in an inert atmosphere.

4. A process for the preparation of a solution of the sodium salt of diaminodioxyarsenobenzene-methylene-sulphoxyl acid in stable, immediately usable, form which comprises the steps of preparing diaminodioxyarsenobenzene by reduction of 3-nitro-4-oxy-benzene-1-arsenic acid, mixing the product with sterilized grape sugar solution, air being excluded from the mixture during the mixing operation, adding formaldehyde sulphoxylate in an amount sufficient to produce the desired salt, heating the mixture, allowing the solution to stand until the impurities are precipitated, filtering, and then adjusting the clear solution to any desired sugar content by the addition of sterilized grape sugar solution, all of the steps being carried out in an inert atmosphere.

5. A process as claimed in claim 2 in which the sterilized grape sugar solution is added to the diaminodioxyarsenobenzene before precipitation of the insoluble impurities in a closed vessel containing an atmosphere of inert gas, for the purpose of preventing air from reaching the solution.

6. A process as claimed in claim 2 in which the air-free grape sugar solution is mixed with diaminodioxyarsenobenzene before precipitation of the insoluble impurities in a closed vessel containing an inert gas atmosphere, thereby preventing air from reaching the solution, the mixture is heated, after the subsequent addition of formaldehyde sulphoxylate, to substantially 70° C.

BAPTIST REUTER.